(12) United States Patent
Yabuta et al.

(10) Patent No.: US 10,274,910 B2
(45) Date of Patent: Apr. 30, 2019

(54) AIR-CONDITIONING CONTROL SYSTEM

(71) Applicants: Atsuhiro Yabuta, Tokyo (JP); Shigeo Takata, Tokyo (JP)

(72) Inventors: Atsuhiro Yabuta, Tokyo (JP); Shigeo Takata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 47 days.

(21) Appl. No.: 14/647,486

(22) PCT Filed: Jan. 25, 2013

(86) PCT No.: PCT/JP2013/051650
§ 371 (c)(1),
(2) Date: May 27, 2015

(87) PCT Pub. No.: WO2014/115318
PCT Pub. Date: Jul. 31, 2014

(65) Prior Publication Data
US 2015/0316281 A1    Nov. 5, 2015

(51) Int. Cl.
*G05B 15/02* (2006.01)
*F24F 1/32* (2011.01)
(Continued)

(52) U.S. Cl.
CPC .............. *G05B 15/02* (2013.01); *F24F 1/32* (2013.01); *F24F 11/30* (2018.01); *F24F 11/62* (2018.01);
(Continued)

(58) Field of Classification Search
CPC .......... F24F 1/32; F24F 11/001; F24F 11/006; F24F 11/008; F24F 11/0075; F24F 11/0047; G05B 15/02
See application file for complete search history.

(56) References Cited

U.S. PATENT DOCUMENTS

2010/0115364 A1* 5/2010 Grohman ............... H04L 12/413
714/748
2010/0185758 A1   7/2010 Hoga et al.

FOREIGN PATENT DOCUMENTS

EP     2369255 A2    9/2011
JP   2003-139375 A   5/2003
(Continued)

OTHER PUBLICATIONS

Machine Translation of JP 2008249233, Kazuya Tamura, Air Conditioning System, Oct. 16, 2008, Mitsubishi Electric Corporation.*
(Continued)

*Primary Examiner* — Robert E Fennema
*Assistant Examiner* — Christopher W Carter
(74) *Attorney, Agent, or Firm* — Posz Law Group, PLC

(57) ABSTRACT

An air-conditioning control system, includes: an air-conditioning apparatus constructed by connecting one or a plurality of indoor units and one or a plurality of outdoor units by refrigerant pipes; a general-purpose device controller to which a general-purpose device that operates in cooperation with the air-conditioning apparatus is connected, configured to control the general-purpose device; and an energy management gateway, which is communicably connected to the air-conditioning apparatus and the general-purpose device controller through a transmission line, configured to control a device to be controlled, based on a signal related to communication.

10 Claims, 7 Drawing Sheets

(51) Int. Cl.
*F24F 11/30* (2018.01)
*F24F 11/62* (2018.01)
*F24F 11/83* (2018.01)
*F24F 110/00* (2018.01)
*F24F 140/50* (2018.01)
*F24F 140/60* (2018.01)
*F24F 11/54* (2018.01)
*F24F 11/59* (2018.01)
*F24F 11/46* (2018.01)

(52) U.S. Cl.
CPC ............... *F24F 11/83* (2018.01); *F24F 11/46* (2018.01); *F24F 11/54* (2018.01); *F24F 11/59* (2018.01); *F24F 2110/00* (2018.01); *F24F 2140/50* (2018.01); *F24F 2140/60* (2018.01)

(56) References Cited

FOREIGN PATENT DOCUMENTS

| JP | 2004-029904 | A |   | 1/2004 |
| JP | 2005-016859 | A |   | 1/2005 |
| JP | 2008-249233 | A |   | 10/2008 |
| JP | 2008249233  | A | * | 10/2008 |
| JP | 2009-003830 | A |   | 1/2009 |
| JP | 2009-008341 | A |   | 1/2009 |
| JP | 2010-007947 | A |   | 1/2010 |
| JP | 2012-022583 | A |   | 2/2012 |
| KR | 20120065659 | A |   | 6/2012 |

OTHER PUBLICATIONS

Extended European Search Report dated Aug. 30, 2016 issued in corresponding EP patent application No. 3872569.2.
International Search Report of the International Searching Authority dated Apr. 23, 2013 for the corresponding international application No. PCT/JP2013/051650 (and English translation).
Office Action dated Mar. 15, 2016 issued in corresponding JP patent application No. 2014-558397 (and English translation).
Office Action dated Jun. 20, 2017 issued in corresponding JP patent application No. 2016-179698 (and English translation).
Office Action dated Sep. 5, 2017 issued in corresponding JP patent application No. 2016-179698 (and English translation).

* cited by examiner

AIR-CONDITIONING CONTROL SYSTEM

CROSS REFERENCE TO RELATED APPLICATION

This application is a U.S. national stage application of International Application No. PCT/JP2013/051650 filed on Jan. 25, 2013, the disclosure of which is incorporated by reference.

TECHNICAL FIELD

The present invention relates to an air-conditioning control system.

BACKGROUND ART

Hitherto, there is a system for remote monitoring a plurality of air-conditioning apparatuses that are arranged in different buildings, by connecting the air-conditioning apparatus to an information collection center that is remotely placed. This building air-conditioning remote management system is a system used by businesses running the information collection center to provide various services to the owners of buildings where air-conditioning apparatus having a predetermined external communication function is equipped as well as to the users of such an air-conditioning apparatus.

The building air-conditioning remote management system includes a server computer located in the information collection center and a plurality of air-conditioning apparatuses management devices that periodically transmit predetermined data to the server computer. In this remote monitoring system, for example, there are suggested an equipment monitoring system and an equipment information management device that enable an observer monitoring the equipment to quickly notice a problem inhibiting the performance of the equipment such as transmission failure when it occurs (see Patent Literature 1).

CITATION LIST

Patent Literature

Patent Literature 1: Japanese Unexamined Patent Application Publication No. 2004-29904 (paragraph 0017, FIG. 1)

SUMMARY OF INVENTION

Technical Problem

However, for the related-art building air-conditioning remote management system as described in Patent Literature 1 and the like, the information collection center carries out the service, and the building owners, users of the air-conditioning apparatus, and the like, for example, are not assumed to manage the air-conditioning control system in the building in accordance with individual needs. In addition, regarding the air-conditioning system managed by building owners, users of the air-conditioning apparatus, and the like, there is a demand, from those building owners and users, and the like, for an integrated management of respective devices when performing air-conditioning control in cooperation with general-purpose devices such as a humidifier and a heater, other than the air-conditioning apparatus.

To solve the problem described above, it is an object of the present invention to provide an air-conditioning control system capable of performing control in cooperation with a general-purpose device and performing effective system management.

Solution to Problem

An air-conditioning control system according to one embodiment of the present invention includes: an air-conditioning apparatus constructed by connecting one or a plurality of indoor units and one or a plurality of outdoor units by refrigerant pipes; a general-purpose device controller to which a general-purpose device that operates in cooperation with the air-conditioning apparatus is connected and which controls the general-purpose device; and energy management means, which is communicably connected to the air-conditioning apparatus and the general-purpose device controller through a dedicated communication line, configured to control a device to be controlled, based on a signal related to communication.

Advantageous Effects of Invention

According to the air-conditioning control system of the one embodiment of the present invention, by communicably connecting the air-conditioning apparatus, the energy management means, and the general-purpose device controller with each other through the dedicated communication line, it is possible to perform cooperative control of the general-purpose device by, for example, transmitting a signal from the energy management means to the general-purpose device controller and to the air-conditioning apparatus.

DESCRIPTION OF EMBODIMENTS

The following describes an air-conditioning control system according to embodiments of the present invention with reference to the drawings. In addition, in order to facilitate understanding in the description below, terms representing directions (for example, "right", "left", "front", and "back") are used appropriately, but this is merely for the sake of description and is not intended to limit the scope of the invention according to the present application. In addition, each of the devices and matters described in each embodiment may be used in combination where appropriate.

Embodiment 1

Figure 1:
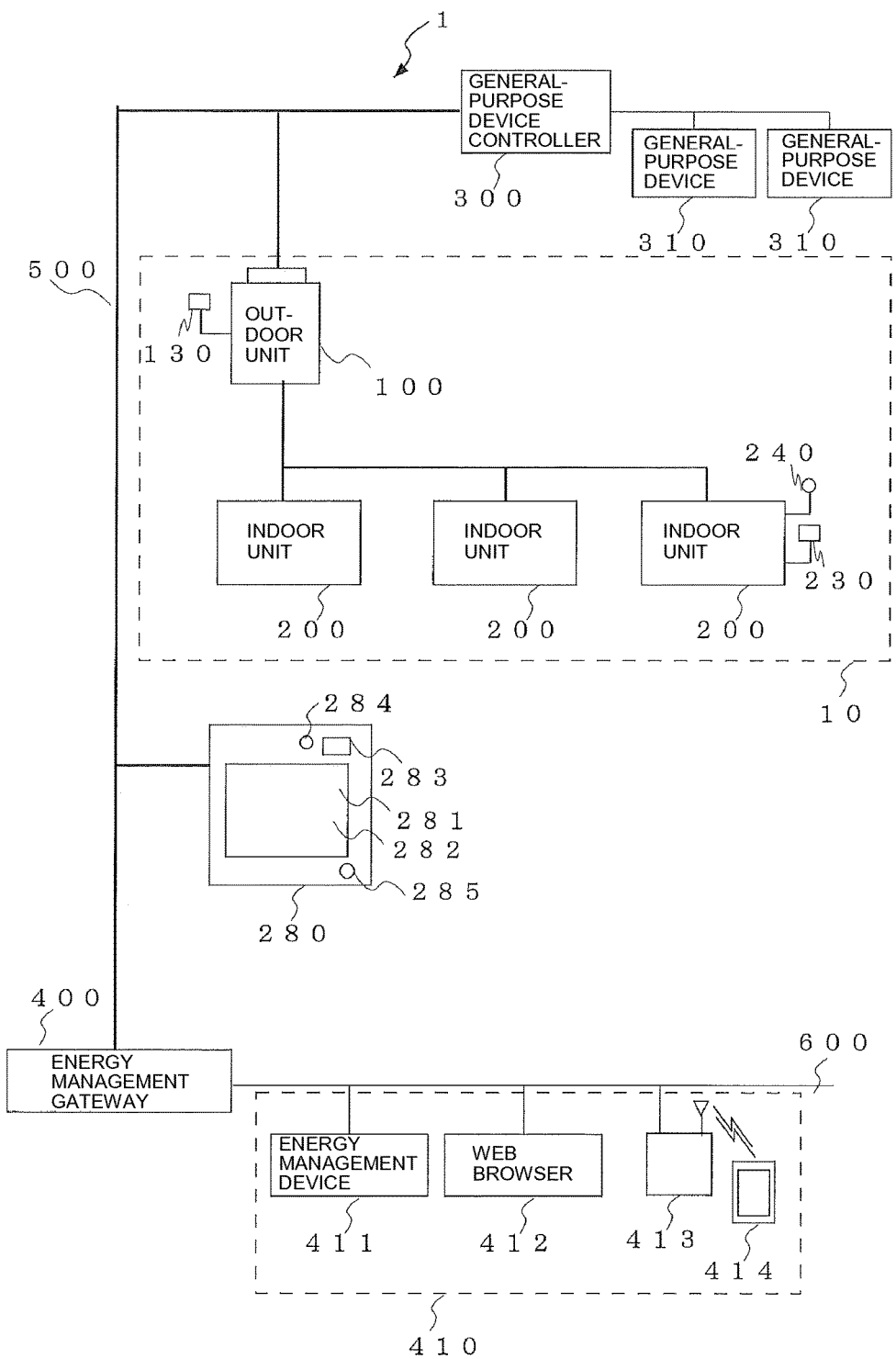
FIG. 1 is a schematic diagram illustrating a configuration focusing on an air-conditioning system 1 according to Embodiment 1 of the present invention.

FIG. 1 is a schematic diagram illustrating a configuration focusing on an air-conditioning system 1 according to Embodiment 1 of the present invention. Here, the description particularly focuses on the configuration of an air-conditioning control system that performs control while performing communication in the air-conditioning system 1. Here, this configuration is a mere example and is not intended to limit the present invention to this configuration. As illustrated in FIG. 1, in the air-conditioning system 1, an outdoor unit 100 and an indoor unit 200 that form an air-conditioning apparatus 10, a general-purpose device controller (equipment control device) 300, an air-conditioning apparatus remote controller 280, and an energy management gateway 400 are communicably connected to each other through a communication line 500 dedicated for air conditioning (hereinafter referred to as the transmission line 500) so that each component can communicate a signal including a different type of data. For example, the energy management gateway 400, which serves as energy management means, transmits a signal representing an operation command and the like based on the content of an operation, to a device to be controlled (instruction target), which is the outdoor unit 100 and the like forming the air-conditioning apparatus 10, and the general-purpose device 310 connected to the general-purpose device controller 300 such as a humidifier and a heater. Here, for the inter-device communication performed through the transmission line 500, communication related to air conditioning (hereinafter referred to as intra communication) is performed by a unique communication scheme (protocol) in accordance with the type of the air-conditioning apparatus 10 and the like. In addition, each device connected through the transmission line 500 has, for example, a unique number, address, and the like for communication (hereinafter referred to as the address), and is distinguished thereby. In addition, when each device performs communication, a signal including data that indicates a destination address and a source address of the signal is transmitted.

In addition, the energy management gateway 400 can be connected to communicate to and from various types of external devices 410 such as an energy management device 411 and a computer WEB browser 412 through a general-purpose communication network such as a local area network 600 (hereinafter LAN 600). In addition, the energy management gateway 400 can also be connected to communicate to and from a mobile terminal 414 that is the external device 410 via a wireless transmission device 413 connected to the LAN 600 (the communication through the LAN 6 is hereinafter referred to as external communication). In addition, the general-purpose device controller 300 can also be connected to communicate to and from each type of general-purpose device (general-purpose equipment device) 310 through a communication line and the like.

The air-conditioning apparatus 10 is formed of one or a plurality of outdoor units (heat source-side device) 100 (one unit illustrated in FIG. 1) and one or a plurality of indoor units (load-side device) 200 (three units illustrated in FIG. 1) that are arranged, for example, in a construction such as a building. However, the configuration of the air-conditioning apparatus 10 is not limited to the above. The outdoor unit 100 and each indoor unit 200 are connected by refrigerant pipes, and air is conditioned by changing the pressure of refrigerant flowing through a pipe to receive and transfer heat from the refrigerant.

Figure 2:
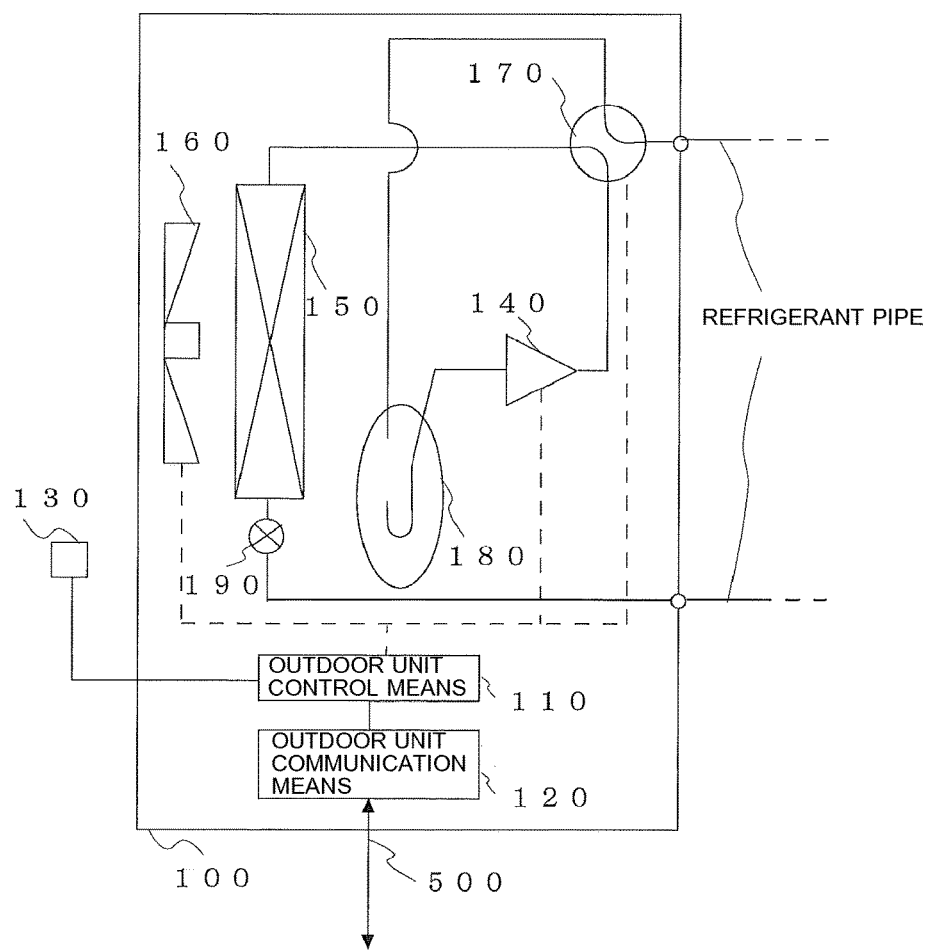
FIG. 2 is a diagram illustrating an example of the configuration of an outdoor unit 100.

FIG. 2 is a diagram illustrating an example of the configuration of the outdoor unit 100. Outdoor unit control means 110, for example, controls the operation of each means included in the outdoor unit 100, based on a signal or the like that is transmitted from the energy management gateway 400 and the like and received by outdoor unit communication means 120. Here, the outdoor unit control means 110 is assumed to include storage means (not shown) in which data required for processing is stored. The outdoor unit communication means 120 is connected to the transmission line 500 so as to be an interface for signal communication between the transmission line 500 and the outdoor unit control means 110. An outdoor unit temperature sensor 130 is detection means for detecting a temperature (air temperature) around the outdoor unit 100. Here, the outdoor unit temperature sensor 130 is described as a part of the configuration of the outdoor unit 100, but may also be provided as a separate unit, for example.

A compressor 140 compresses refrigerant (gas) that is sucked to apply an arbitrary pressure to the refrigerant based on operating frequency, and sends out (discharges) the refrigerant. Although not particularly limited, the compressor 140 may be, for example, a variable displacement inverter compressor including an inverter circuit, which can vary its capacity (the amount of refrigerant to be sent out per unit time) by arbitrarily changing the operating frequency. An outdoor unit-side heat exchanger 150 exchanges heat between the refrigerant passing through the heat exchanger and the air. An outdoor unit-side fan 160, for example, sends air for heat exchange to the outdoor unit-side heat exchanger 150. A four-way switching valve 170 is a valve for switching a pipe route, for example, depending on the cooling operation and the heating operation. An accumulator (liquid separator) 180 is an apparatus for pooling a liquid and causing the compressor 140 to suck only gas refrigerant. In addition, an outdoor unit-side expansion valve 190 controls the flow of the refrigerant by adjusting the valve opening degree based on an instruction from the outdoor unit control means 110.

Figure 3:
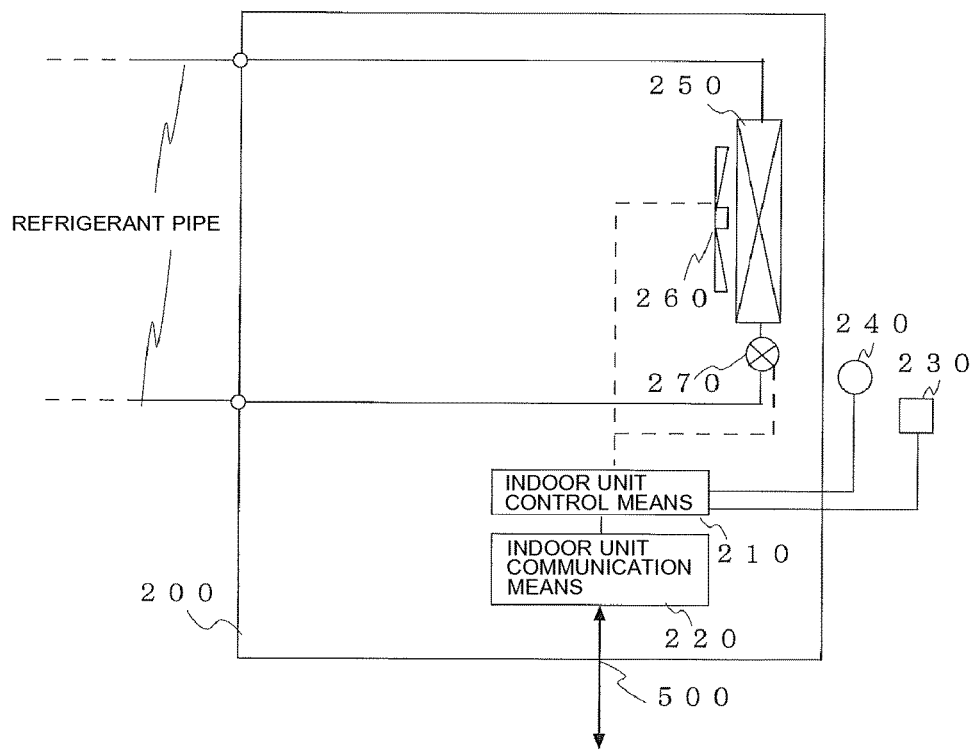
FIG. 3 is a diagram illustrating an example of the configuration of an indoor unit 200.

FIG. 3 is a diagram illustrating an example of the configuration of the indoor unit 200. Indoor unit control means 210 controls the operation of each means included in the indoor unit 200, based on, for example, a signal including an operation instruction from the air-conditioning remote controller 280, a signal received by indoor unit communication means 220, and the like. Here, the indoor unit control means 210 is assumed to include storage means (not shown) in which data required for processing is stored. The indoor unit communication means 220 is connected to the transmission line 500 so as to be an interface for signal communication between the transmission line 500 and the indoor unit control means 210. Here, in this embodiment, the indoor unit 200 can receive and transmit signals directly through the transmission line 500, but the communication may also be performed indirectly via the outdoor unit 100, for example.

An indoor unit temperature sensor 230 is detection means for detecting, for example, the temperature (air temperature) in the room where the indoor unit 200 is arranged. In addition, an indoor unit humidity sensor 240 is detection means for detecting humidity in the room. A signal related to the detection by the indoor unit temperature sensor 230 or the indoor unit humidity sensor 240 is transmitted to the indoor unit control means 210. Here, the indoor unit temperature sensor 230 and the indoor unit humidity sensor 240 are described as a part of the configuration of the indoor unit 200, but may also be provided as separate units, for example. Based on the signal, the indoor unit control means 210 performs processing including generating data related to temperature and humidity, and transmitting a signal including data related to temperature and humidity to the outdoor unit 100 and the energy management gateway 400.

An indoor unit-side heat exchanger 250 exchanges heat between the refrigerant passing through the heat exchanger and the air. An indoor unit-side fan 260 sends air to the indoor unit-side heat exchanger 250 to exchange the heat, and further sends the air after heat exchange into the room. An indoor unit-side expansion valve 270 controls the flow of the refrigerant by adjusting the valve opening degree based on an instruction from the indoor unit control means 210. With this, the amount of refrigerant passing through the indoor unit-side heat exchanger 250 is controlled, thereby adjusting evaporation of the refrigerant and the like in the indoor unit-side heat exchanger 250. The air-conditioning remote controller 280 transmits, to the indoor unit control means 210, an operation-command signal that is entered by an operator via a remote controller and the like, for example, a temperature setting and an operation mode.

The energy management gateway 400 is a device that is communicably connected through the transmission line 500, and performs intensive (integrated) control of devices to be managed in the air-conditioning system 1, including such devices as the air-conditioning apparatus 10 (outdoor unit 100 and indoor unit 200) and the general-purpose device 310. Here, for example, when the energy management gateway 400 controls the general-purpose device 310, the energy management gateway 400 transmits a signal such as an instruction to the general-purpose device controller 300 through the transmission line 500, and the general-purpose device controller 300 processes the signal, thus controlling the general-purpose device 310.

In addition, for air-conditioning control, it is possible to control the indoor unit 200 and the like, based on the setting of a target temperature (preset temperature) for the space to be air-conditioned. At this time, for example, it is possible to perform setback control by setting a target temperature range (upper-limit temperature and lower-limit temperature).

Further, through the LAN 600, for example, it is possible to communicate to and from an external apparatus 410 in relation to the monitoring, management, and the like of the air-conditioning system 1. For example, it is possible to achieve energy saving of the entire air-conditioning system 1 by causing the energy management device 411 to control the power management of the air-conditioning apparatus 10, the general-purpose device 310, and the like via the energy management gateway 400. Here, the data included in the signal to be transmitted to the external apparatus 410 is assumed to be management-related data (for example, a group configuration for the air-conditioning apparatus 10, charges, and the like) that is obtained as a result of processing including calculation performed by the energy management gateway 400. In addition, the communication is performed using a protocol that allows transmitting and receiving XML (Extensible Markup Language), which has versatility.

Then, data on the power consumed by a part or all of the preset devices included in the air-conditioning system 1 is collected, and processing including aggregation is performed. In addition, when the energy management gateway 400 includes display means, the display means displays the content of the collected data on the power, the aggregated power, and the like. In addition, it is possible to charge by adding operating hours of a part or all of the devices included in the air-conditioning system 1. The device configuration of the energy management gateway 400 in relation to communication, processing, and the like is to be described later.

The general-purpose device controller 300 is a device that controls one or a plurality of general-purpose devices (general-purpose equipment devices) 310. For example, the general-purpose device controller 300 is connected between the transmission line 500 and one or a plurality of general-purpose devices (general-purpose equipment devices) 310 that cannot be directly connected to the transmission line 500. For example, the general-purpose device controller 300 performs cooperative control of the general-purpose device 310 such as an actuator, based on a signal transmitted from the energy management gateway 400 through the transmission line 500. In addition, the general-purpose device controller 300 performs processing including converting the format of a signal transmitted from the general-purpose device 310 such as a sensor, and transmits the signal to the transmission line 500 side. Here, the general-purpose device controller 300 is assumed to be able to receive power supply through the transmission line 500. The device configuration of the general-purpose controller 300 in relation to communication, processing, and the like is to be described later.

Here, the general-purpose device 310 includes a device (actuator) for conditioning the air in cooperation with the air-conditioning system 1, such as a ventilator and a humidifier, and each type of sensor (detection means) for detecting a physical quantity of temperature and the like. In addition, the general-purpose device 310 may not only be another device related to air conditioning but also be an equipment, a device, a system, or the like that operates in cooperation with the air-conditioning system 1, such as a lighting equipment (system) and a disaster prevention equipment (system).

By installing the general-purpose device controller 300 that enables cooperative control with the general-purpose device 310, it is possible to increase the range of air-conditioning control. For example, at this time, it is not necessary to change the air-conditioning apparatus 10 if processing related to the cooperation is performed to transmit the signal related to the control to the general-purpose device 310 side in addition to the signal conversion. In addition, because this allows changing the cooperation only by changing the processing performed by the general-purpose controller 300, it is possible to increase versatility and extensibility. In addition, because this allows including the general-purpose device 310 in the control of the air-conditioning system 1, it is possible to expect effects including a reduction in the number of devices that need to be independently developed. Thus, it is possible to achieve compatibility with a small-scale air-conditioning system at low cost.

The air-conditioning remote controller 280 includes a remote controller operation unit 281, and transmits, to the transmission line 500, a signal based on each type of operation performed by, for example, the operator through the remote controller operation unit 281, which is an instruction for running, stopping, and the like of the air-conditioning apparatus 10, the general-purpose device 310 connected to the general-purpose device controller 300, and the like, settings for temperature and humidity, and the like. In addition, the air-conditioning remote controller 280 includes a remote controller display unit 282, and performs display, for example, based on the data included in the signal transmitted through the transmission line 500. Here, for example, by using a touch panel type air-conditioning remote controller 280, it is possible to allow the remote controller display unit 282 to display the content of operation on the screen. In addition, by enabling the air-conditioning remote controller 280 to switch screens in accordance with the content of operation, it is possible to perform operations related to the air-conditioning apparatus 10 and related to the general-purpose device 310 by switching display contents.

In addition, the air-conditioning remote controller 280 according to this embodiment further includes a human sensor 283, a luminance sensor 284, and a temperature and humidity sensor 285. The human sensor 283 is detection means for determining whether or not there is a person near the air-conditioning remote controller 280. For example, the human sensor 283 turns off the backlight of the remote controller display unit 282 when determining that there is no one around, and turns on the backlight when determining that there is a person, thus achieving energy saving. The luminance sensor 284 is means for detecting luminance around the air-conditioning remote controller 280. The temperature and humidity sensor 285 is means for detecting the temperature and humidity around the air-conditioning remote controller 280.

Here, the air-conditioning remote controller 280 according to this embodiment has a function to support an initial setting performed by an operator on the general-purpose device 310 connected to the general-purpose device controller 300. Then, based on the data related to the initial setting of the general-purpose device 310 connected to the general-purpose device controller 300, the air-conditioning remote controller 280 receives an input of each type of operation, such as running and stopping of the general-purpose device 310 and setting of temperature and humidity. In addition, in the case where intensive management of the air-conditioning apparatus 10 and the general-purpose device 310 is performed by the energy management gateway 400, the remote controller display unit 282, for example, is caused to display that the intensive management is performed by the energy management gateway 400.

Figure 4:
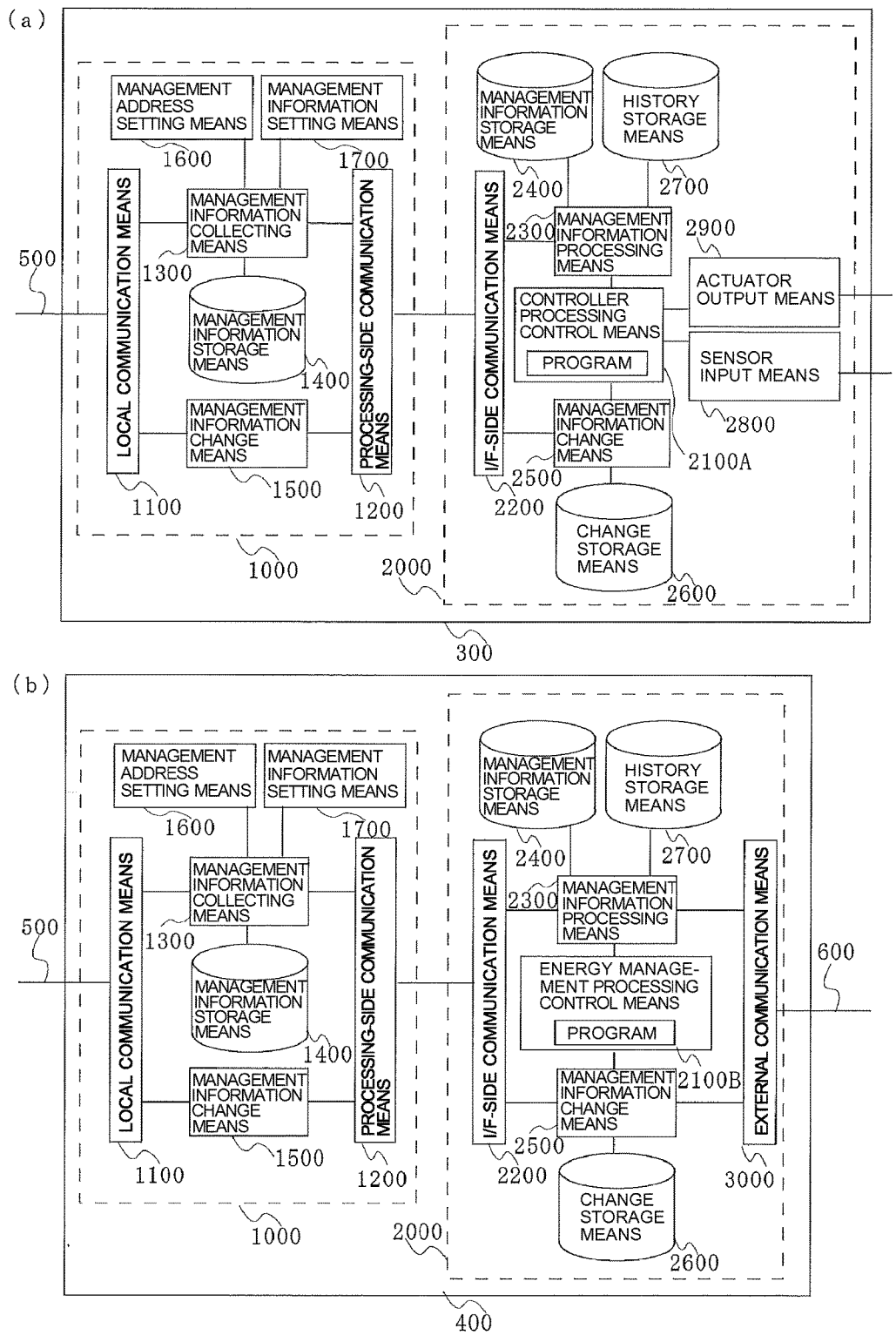
FIG. 4 is a diagram illustrating the configurations of a general-purpose device controller 300 and an energy management gateway 400 according to Embodiment 1.

FIG. 4 are diagrams illustrating the configurations of the general-purpose controller 300 and the energy management gateway 400. FIG. 4(a) illustrates the configuration of the general-purpose controller 300, and FIG. 4(b) illustrates the configuration of the energy management gateway 400. As illustrated in FIG. 4, in the device forming the air-conditioning system according to this embodiment, particularly in the device that performs management, control, and the like, the interface configuration unit 1000 and the processing configuration unit 2000 are integrally included. In addition, the interface configuration unit 1000 has a common configuration, and the processing configuration unit 2000 has a configuration suitable for the function of each device.

The interface configuration unit 1000, for example, transmits a signal related to an instruction and the like to the transmission line 500 (the air-conditioning apparatus and the like), based on a signal transmitted from the processing configuration unit 2000. In addition, the interface configuration unit 1000 receives a signal flowing through the transmission line 500 to collect data, and transmits, to the processing configuration unit 2000, the data that is determined to be transmitted to the processing configuration unit 2000 side.

Local communication means 1100 is connected to the transmission line 500. The local communication means 1100 receives a signal flowing through the transmission line 500 and extracts data from the signal. In addition, the local communication means 1100 transmits, to the transmission line 500, management information transmitted from management information change means 1500. Management information collecting means 1300 performs collection processing of necessary data as management information from the data extracted by the local communication means 1100, and stores the management information in management information storage means 1400. Here, the management information collecting means 1300 is assumed to include counting means such as a timer so as to perform the collection processing. The management information storage means 1400 stores, as data, the management information collected by the management information collecting means 1300. Here, the data related to the management information includes, for example, the operation mode, velocity, wind direction, and preset room temperature for the indoor unit 200.

Processing-side communication means 1200 transmits a signal including the data stored in the management information storage means 1400, to the processing configuration unit 2000 at a regular time interval. In addition, the processing-side communication means 1200 transmits a signal from the processing configuration unit 2000 to the management information change means 1500. In addition, the management information change means 1500 performs processing of management information to be changed, based on an instruction from the processing configuration unit 2000 via the processing-side communication means 1200.

Management address setting means 1600 is means for setting an address corresponding to a device whose management information is required by the processing configuration unit 2000 among devices (including the outdoor unit 100 and the indoor unit 200) connected to the transmission line 500. In addition, management information setting means 1700 is means for setting management information required by the processing configuration unit 2000.

As described above, the configuration of the processing configuration unit 2000 differs depending on the function and the like of the device. For example, in the general-purpose device controller 300, as illustrated in FIG. 4(a), the processing configuration unit 2000 includes controller processing control means 2100A, sensor input means 2800, and actuator output means 2900. In addition, in the energy management gateway 400, as illustrated in FIG. 4(b), the processing configuration unit 2000 includes energy management processing control means 2100B and external communication means 3000.

The controller processing control means 2100A performs processing to realize the function of the general-purpose device controller 300. In addition, the energy management processing control means 2100B performs processing to realize the function of the energy management gateway 400 (the controller processing control means 2100A and the energy management processing control means 2100B are hereinafter both described as the processing control means 2100 in the case where they are not particularly distinguished from each other). The processing control means 2100 has a procedure for the content of processing as a program (application) in advance, and realizes the function of each device by executing the program. Because it is possible to configure the processing control means corresponding to each device by causing the program required for each device to be stored in a storage unit and the like (not shown) to be executed, there is no need to configure the processing control means for each device through dedicated design and the like, thus allowing reduction of design time and the like. In addition, by modularizing the program to be configured as a program module, it is possible to perform update (including addition and deletion of a function) easily.

I/F-side communication means 2200 is intermediary means for exchanging data between the processing control means 2100 and the interface configuration unit 1000. Management information storage means 2400 stores as data, management information transmitted from the interface configuration unit 1000 side via the I/F-side communication means 2200. Management information change means 2500 performs processing of the management information to be changed, based on the result of the processing performed by the processing control means 2100, an instruction from the external apparatus 410, and the like. Change storage means 2600 stores, as data, the management information changed and processed by the management information change means 2500. History storage means 2700 stores change history of the management information as data. In FIG. 4(a), management information processing means 2300 intermediates between controller processing control means 2100A and both of management information storage means 2400 and history storage means 2700. Management information processing means 2300 connects with I/F-side communication means 2200. In FIG. 4(b), management information processing means 2300 intermediates between energy management processing control means 2100B and both of management information storage means 2400 and history storage means 2700. Management information processing means 2300 connects with both of I/F-side communication means 2200 and external communication means 3000.

In the general-purpose device controller 300 illustrated in FIG. 4(a), the sensor input means 2800 receives a signal input when a sensor is connected as the general-purpose device 310. In addition, the actuator output means 2900 outputs a signal when an actuator or the like is connected as the general-purpose device 310. In addition, in the energy management gateway 400, the external communication means 3000 is means that serves as an interface for communicating to and from the external apparatus 410 through the LAN 600, for example.

In the configuration of the air-conditioning remote controller 280, the interface configuration unit 1000 and the processing configuration unit 2000 are integrally included, and processing to realize the function of the air-conditioning remote controller 280 is performed in the processing configuration unit 2000.

Figure 5:
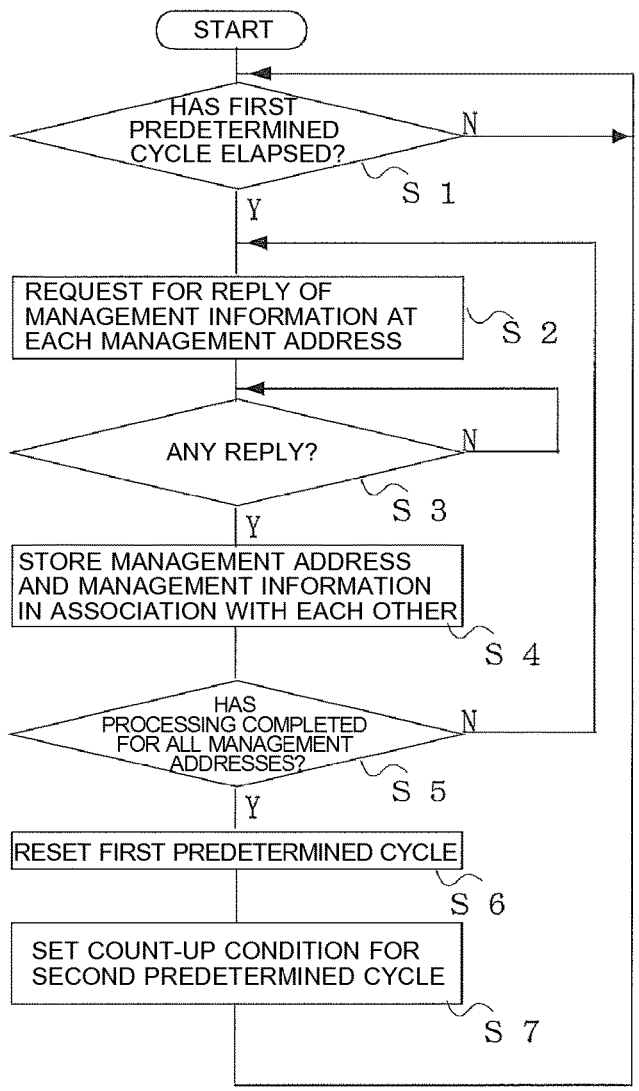
FIG. 5 is a diagram illustrating a processing procedure related to collecting management information in an interface configuration unit 1000 according to Embodiment 1 of the present invention.

FIG. 5 is a diagram illustrating a processing procedure related to collecting management information in the interface configuration unit 1000 according to Embodiment 1 of the present invention. In FIG. 5, a collection procedure performed at a first predetermined cycle is described.

When determining that the first predetermined cycle has elapsed (S1), for each management address, the management information collecting means 1300 requests a corresponding apparatus to return necessary management information via the local communication means 1100 (S2). Here, the request may be performed for each piece of necessary management information at each management address, or may also be collectively performed for all necessary management information.

It is determined whether or not there is a reply from the requested device (S3). At this time, the local communication means 1100 extracts data from a signal flowing through the transmission line 500. Here, the data is assumed to include a source address, a destination address, and actual data. When it is determined that there is a reply, the source address (management address) and the actual data that are included in a signal related to the reply are associated with each other, and the management information is stored in the management information storage means 1400 (S4). Then, it is determined whether or not the necessary management information is obtained for all management addresses (S5). When it is determined that all the necessary information is not obtained, procedures from S2 to S4 are repeated.

On the other hand, when it is determined that the necessary management information is obtained for all management addresses, the first predetermined cycle is reset, and counting is started again (S6). Then, a count-up condition for a second predetermined cycle is set (S7). Here, the second predetermined cycle is a cycle at which the management information is collectively transmitted from the interface configuration unit 1000 side to the processing configuration unit 2000 side. It is assumed that the second predetermined cycle is longer than the first predetermined cycle (the first predetermined cycle<the second predetermined cycle).

Figure 6:
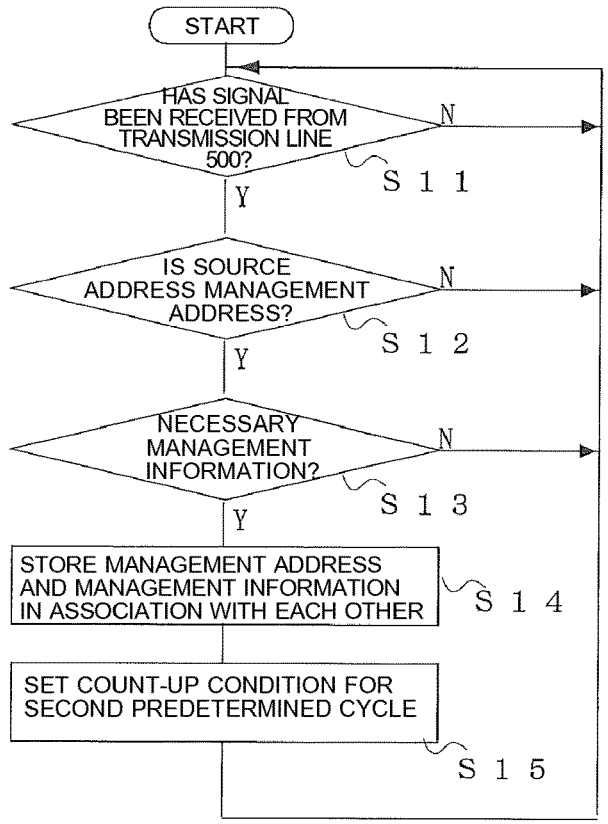
FIG. 6 is a diagram illustrating a processing procedure related to collecting management information in the interface configuration unit 1000 according to Embodiment 1 of the present invention.

FIG. 6 is a diagram illustrating a processing procedure related to collecting management information in the interface configuration unit 1000 according to Embodiment 1 of the present invention. In FIG. 6, a procedure for collection irrespective of the first predetermined cycle is described.

For example, different types of signals flow through the transmission line 500, but basically a signal flowing through the transmission line 500 is transmitted to all devices connected to the transmission line 500. Thus, the management information collecting means 1300 determines whether or not the local communication means 1100 has received (has extracted data) the signal flowing through the transmission line 500 (S11).

The management information collecting means 1300 determines whether or not the source address is the same as the management address based on the data extracted by the local communication means 1100 (S12). When it is determined that the source address is not the same as the management address, the management information collecting means 1300 finishes the processing and returns to S11, to wait for a signal input.

When it is determined that the source address and the management address are the same with each other, the management information collecting means 1300 further determines whether or not the content of the actual data is necessary management information (S13). When it is determined that the actual data is not necessary management information, the management information collecting means 1300 finishes the processing and returns to S11, to wait for a signal input. When it is determined that the actual data is necessary management information, the management address and the actual data are associated with each other, and the management information is stored in the management information storage means 1400 (S14). Then, the count-up condition for the second predetermined cycle is set (S15).

Figure 7:
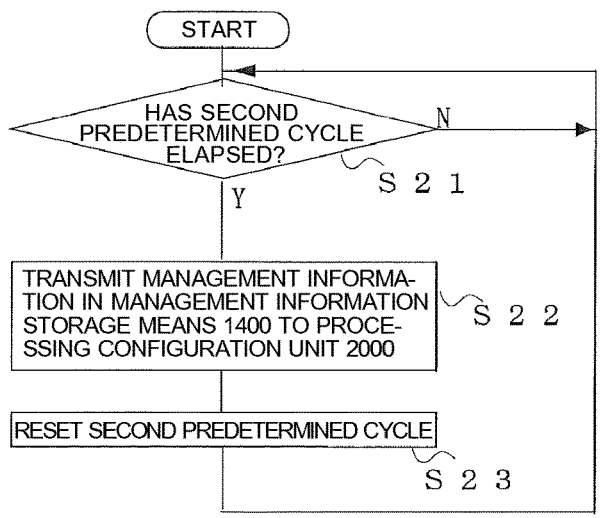
FIG. 7 is a diagram illustrating a processing procedure related to transmitting management information to a processing configuration unit 2000, which is performed in the interface configuration unit 1000.

FIG. 7 is a diagram illustrating a processing procedure related to transmitting management information to the processing configuration unit 2000, which is performed in the interface configuration unit 1000. The transmission of management information to the processing configuration unit 2000 is performed at the second predetermined cycle.

When it is determined that the second predetermined cycle has elapsed (S21), the management information collecting means 1300 transmits a signal including the management information stored in the management information storage means 1400 to the processing configuration unit 2000 via the processing-side communication means 1200 (S22). Then, the second processing cycle is reset, and counting is started again (S23). As described above, in each apparatus, management information is delivered (transmitted) from the interface configuration unit 1000 to the processing configuration unit 2000 at the second predetermined cycle.

Figure 8:
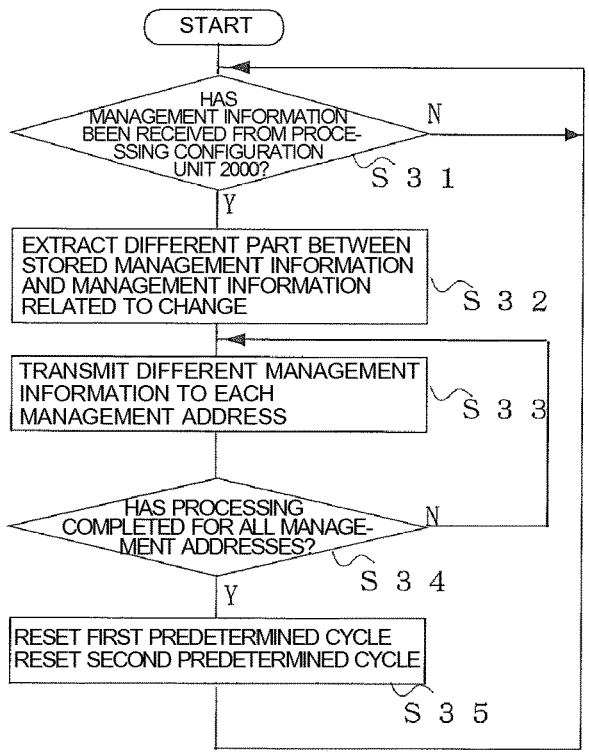
FIG. 8 is a diagram illustrating a processing procedure performed by the interface configuration unit 1000 in response to a change in the management information from the processing configuration unit 2000.

FIG. 8 is a diagram illustrating a processing procedure performed by the interface configuration unit 1000 in response to the change in the management information from the processing configuration unit 2000. Here, priority is given to the control within the air-conditioning system, which is based on the signal (management information) flowing in the air-conditioning system. Thus, the processing related to the change in the management information from the processing configuration unit 2000 is given lower priority than the collection processing and the processing for transmission to the processing configuration unit 2000 both performed in the interface configuration unit 1000, so as to be performed when the collection processing and the transmission processing are not performed.

It is determined, via the processing-side communication means 1200, whether or not the management information related to the change and the management address of the device to be changed are received from the processing configuration unit 2000 (S31). Here, the management information and the like related to the change are collectively transmitted from the processing configuration unit 2000. The management information change means 1500, for example, compares the management information stored in the management information storage means 1400 and the management information related to the change, and extracts a different part (S32). Then, to each management address, the management information change means 1500 transmits, via the local communication means 1100, a signal including the management information which is related to the change and from which the different part is extracted (S33).

It is determined whether or not the management information is transmitted to all the management addresses (S34). When it is determined that all the necessary information is not transmitted, procedures from S33 to S34 are repeated.

On the other hand, when it is determined that the management information is transmitted to all the management addresses, the first predetermined cycle and the second predetermined cycle are reset, and counting is started again (S35).

As described above, according to the air-conditioning control system of Embodiment 1, in devices connected to the transmission line 500 in which a signal of a unique communication system flows, for example, in such devices as the general-purpose device controller 300, the energy management gateway 400, and the like, because each device is formed of the interface configuration unit 1000 and the processing configuration unit 2000, it is possible to configure the processing configuration unit 2000 using a general-purpose component instead of a special-purpose component by causing the interface configuration unit 1000 to perform signal conversion processing and the like, thereby achieving cost reduction. In addition, at this time, regarding the data in the signal flowing through the transmission line 500, because it is designed such that the management information that is to be transmitted to the processing configuration unit 2000 is selected in the interface configuration unit 1000, it is possible to prevent unnecessary data leaks from the signal flowing through the transmission line 500, reduce the processing load of the processing configuration unit 2000, and the like.

Embodiment 2

Figure 9:
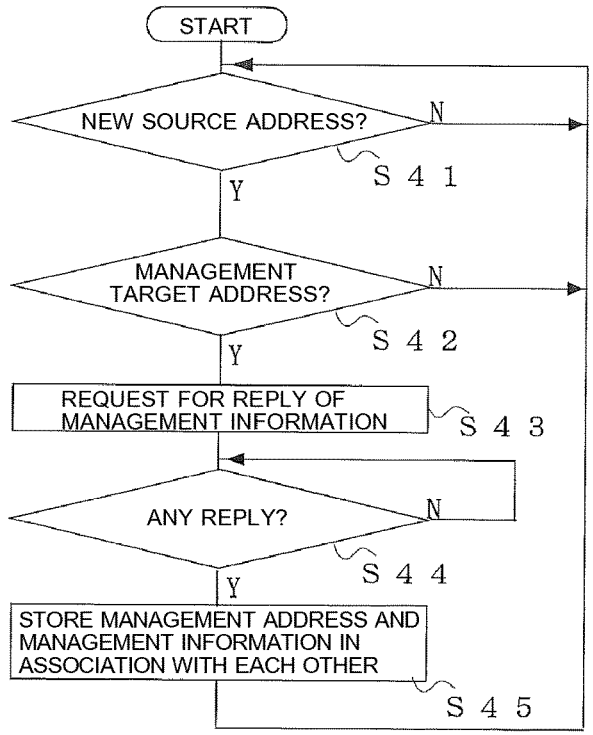
FIG. 9 is a diagram illustrating a processing procedure related to setting a management address and the like in the interface configuration unit 1000 according to Embodiment 2 of the present invention.

FIG. 9 is a diagram illustrating a processing procedure related to setting a management address and the like in the interface configuration unit 1000 according to Embodiment 2 of the present invention. For example, as illustrated in FIG. 6, a signal flowing through the transmission line 500 is transmitted to the interface configuration unit 1000. At this time, the management address setting means 1600 determines, based on the data extracted by the local communication means 1100, whether or not the source address is a new address that is not yet set as the management address (S41).

When determining that the address is a new address, the management address setting means 1600 determines whether or not the address is a management target address (S42). Here, the management target address is assumed to be an address that is not previously set as the management address among addresses corresponding to a range of devices that are set to be managed. For example, in some cases, it is not necessary to set all the devices among the outdoor unit 100 and the indoor units 200 connected through the transmission line 500 to be managed. Therefore, by specifying the range to be managed, an address that is not necessary for the device is not set as the management address. In addition, for the range to be managed, for example, there is a case where an address, which is once set as the management address, is determined to be non-managed according to the processing configuration unit 2000. The management address setting means 1600 stores an address that is set as non-managed, and avoids setting the address as the management target address when it is determined that the source address and the non-managed address correspond to each other.

When it is determined that the source address is the management target address, the management address setting means 1600 requests, via the local communication means 1100, a device corresponding to the management target address to return necessary management information (S43). It is determined whether or not there is a reply from the requested device (S44). When it is determined that there is a reply, the source address (management address) and the actual data that are included in the signal related to the reply are associated with each other, and the management information is stored in the management information storage means 1400 (S45).

As described above, according to the air-conditioning control system of Embodiment 2, the management address is set at the interface configuration unit 1000 side, and the management information related to the set management address is transmitted to the processing configuration unit 2000 side, thus making it possible to prevent unnecessary data from leaking from a signal flowing through the transmission line 500.

REFERENCE SIGNS LIST 1 air-conditioning system 100 outdoor unit 110 outdoor unit control means 120 outdoor unit communication means 130 outdoor unit temperature sensor 140 compressor 150 outdoor unit-side heat exchanger 160 outdoor unit-side fan 170 four-way switching valve 190 outdoor unit-side expansion valve 200 indoor unit 210 indoor unit control means 220 indoor unit communication means

230 indoor unit temperature sensor 240 indoor unit humidity sensor 250 indoor unit-side heat exchanger 260 indoor unit-side fan

270 indoor unit-side expansion valve 280 air-conditioning remote controller 281 remote controller operation unit 282 remote controller display unit 283 human sensor 284 luminance sensor

285 temperature and humidity sensor 300 general-purpose device controller 310 general-purpose device 400 energy management gateway 410 external device 411 energy management device 412 WEB browser 413 wireless transmission device 414 mobile terminal 500 transmission line 600 local area network (LAN) 1000 interface configuration unit 1100 local communication means 1200 processing-side communication means 1300 management information collecting means 1400 management information storage means

1500 management information change means 1600 management address setting means 1700 management information setting means 2000 processing configuration unit 2100 processing control means 2100A controller processing control means 2100B energy management processing control means 2200 side communication means 2400 management information storage means 2500 management information change means 2600 change storage means

2700 history storage means 2800 sensor input means 2900 actuator output means 3000 external communication means

The invention claimed is:

1. An air-conditioning control system, comprising:
an air-conditioning apparatus constructed by connecting one or a plurality of indoor units and one or a plurality of outdoor units by refrigerant pipes;
a general-purpose device controller to which a general-purpose device that operates in cooperation with the air-conditioning apparatus is connected, to control the general-purpose device; and
an energy management unit, which is communicably connected to the air-conditioning apparatus and the general-purpose device controller through a dedicated communication line, configured to control one or more previously registered general-purpose devices, based on a signal related to communication transmitted from the air-conditioning apparatus and the general-purpose device controller, wherein
the general-purpose device controller includes
a processing configuration device configured to perform processing for controlling the general-purpose device based on management information related to air-conditioning control, and
an interface configuration device configured to perform intermediary processing for transmitting and receiving the management information between the dedicated communication line and the processing configuration device, and
the interface configuration device is configured to
send a request to the one or more previously registered general-purpose devices to return necessary management information at the end of a first predetermined timer of a predetermined address management timer corresponding to previously stored management information,
determine whether a reply has been received corresponding to the management information of one or more of the previously registered general-purpose devices,
restore the management information corresponding to each of the previously registered general-purpose devices in response to an affirmative determination that the management information has been received, and
reset the first predetermined timer of the predetermined address management timer and increment a second predetermined timer of the predetermined address management timer in response to restoring the management information for one or more of the previously registered general-purpose devices,
transmit the management information corresponding to each of the previously registered general-purpose devices stored by the interface configuration device to the processing configuration device at an end of the second predetermined timer, wherein
the first predetermined timer controls execution of collection of management information by the interface configuration device, and
the second predetermined timer controls execution of transmission of a signal including the management information stored by the interface configuration device to the processing configuration device.

2. The air-conditioning control system of claim 1, wherein when the interface configuration device receives a signal through the dedicated communication line after a management address and a content of information, which are related to the management information to be transmitted to the processing configuration device and belong to each device in the air-conditioning control system, are set, the interface configuration device determines the management address and the content of information that are included in the signal, and transmits the management information related to the setting to the processing configuration device.

3. An air-conditioning control system, comprising:
an air-conditioning apparatus constructed by connecting one or a plurality of indoor units and one or a plurality of outdoor units by refrigerant pipes;
a general-purpose device controller to which a general-purpose device that operates in cooperation with the air-conditioning apparatus is connected, to control the general-purpose device; and
an energy management unit, which is communicably connected to the air-conditioning apparatus and the general-purpose device controller through a dedicated communication line, configured to control one or more previously registered general-purpose devices, based on a signal related to communication transmitted from the air-conditioning apparatus and the general-purpose device controller, wherein
the general-purpose device controller includes
a processing configuration device configured to perform processing for controlling the general-purpose device based on management information related to air-conditioning control, and
an interface configuration device configured to perform intermediary processing for transmitting and receiving the management information between the dedicated communication line and the processing configuration device,
when the interface configuration device receives a signal through the dedicated communication line after a management address and a content of information, which are related to the management information to be transmitted to the processing configuration device and belong to each device in the air-conditioning control system, are set, the interface configuration device determines the management address and the content of information that are included in the signal, and transmits the management information related to the setting to the processing configuration device, and the interface configuration device controls the one or more previously registered general-purpose devices to request for returning the management information at an expiration of a first predetermined timer of a predetermined address management timer corresponding to previously stored management information, and controls to perform collection processing on the management information by receiving a signal flowing through the dedicated communication line and determining whether or not the one or more previously registered general-purpose devices and the management information is necessary, reset the first predetermined timer of the predetermined address management timer and increment a second predetermined timer of the predetermined address management timer in response to restoring the management information for one or more of the previously registered general-purpose devices, and transmit the management information corresponding to each of the previously registered general-purpose devices stored by the interface configuration device to the processing configuration device at the end of the second predetermined timer, wherein the first predetermined timer controls execution of collection of management information by the interface configuration device, and the second predetermined timer controls execution of transmission of a signal including the management information stored by the interface configuration device to the processing configuration device.

4. The air-conditioning control system of claim 3, wherein the interface configuration device transmits, to the processing configuration device, the management information obtained by the collection processing, at an expiration of a second predetermined timer of the predetermined address-management timer that is longer than the first predetermined cycle.

5. The air-conditioning control system of claim 1, wherein the interface configuration device gives higher priority to processing for collecting the management information from the dedicated communication line and processing for transmitting the management information to the processing configuration device than to processing for transmitting the management information from the processing configuration device to the dedicated communication line.

6. The air-conditioning control system of claim 2, wherein when it is determined that the signal transmitted through the dedicated communication line is a signal from a device corresponding to a new source address, the interface configuration device sets, as the management address, an address determined to be an address which is related to a device within a range previously set to be managed and with which the setting is not canceled yet.

7. The air-conditioning control system of claim 1,
wherein the processing configuration device includes processing a control device for performing processing related to the management information, and
wherein the processing control device is formed with an updatable program module.

8. The air-conditioning control system of claim 1, wherein the management information includes at least a source address and a destination address of the corresponding general-purpose device.

9. The air-conditioning control system of claim 3, wherein the management information includes at least a source address and a destination address of the corresponding general-purpose device.

10. An air-conditioning control system, comprising:
an air-conditioning apparatus constructed by connecting one or a plurality of indoor units and one or a plurality of outdoor units by refrigerant pipes;
a general-purpose device controller to which a general-purpose device is connected, to control the general-purpose device connected;
an energy management unit configured to control the air-conditioning apparatus and to control the general purpose device through the general-purpose device controller; and
a dedicated communication line which is communicably connected among at least the air-conditioning apparatus, the general-purpose device controller and the energy management unit, respectively, wherein
the general-purpose device controller includes
an interface configuration unit configured to receive a signal from the dedicated communication line, select necessary management information for controlling the general purpose device from the signal, perform collection processing on the management information based on a first predetermined timer, increment a second predetermined timer in response to the first predetermined timer being reset upon receiving and storing the management information,
a processing configuration unit configured to receive the management information processed by the interface configuration unit at an end of the second predetermined timer and control the general-purpose device based on the management information received,
the first predetermined timer controls execution of collection of management information by the interface configuration device, and
the second predetermined timer controls execution of transmission of a signal including the management information stored by the interface configuration device to the processing configuration device.

* * * * *